United States Patent
Erickson

(10) Patent No.: US 7,438,243 B1
(45) Date of Patent: Oct. 21, 2008

(54) TIE-DOWN ANCHOR FOR A SELF-PROPELLED IRRIGATION SYSTEM

(76) Inventor: Lauren N. Erickson, 2400 Prairie Island Rd., Clarks, NE (US) 68628

(*) Notice: Subject to any disclaimer, the term of this patent is extended or adjusted under 35 U.S.C. 154(b) by 802 days.

(21) Appl. No.: 10/884,667

(22) Filed: Jul. 2, 2004

(51) Int. Cl.
*B05B 3/00* (2006.01)

(52) U.S. Cl. .............. 239/735; 239/723; 239/728; 52/155; 52/157

(58) Field of Classification Search .......... 239/722–749; 52/155–165

See application file for complete search history.

(56) References Cited

U.S. PATENT DOCUMENTS

| | | | | | |
|---|---|---|---|---|---|
| 2,801,132 | A | * | 7/1957 | Shuck | 239/736 |
| 3,771,719 | A | * | 11/1973 | Raso et al. | 239/728 |
| 4,590,732 | A | * | 5/1986 | Hallman | 52/704 |
| 5,040,924 | A | * | 8/1991 | Kothman | 405/244 |

* cited by examiner

*Primary Examiner*—Christopher S Kim
(74) *Attorney, Agent, or Firm*—Thomte Patent Law Office LLC; Dennis L. Thomte

(57) ABSTRACT

A tie-down anchor for a self-propelled irrigation machine comprising an anchor embedded in the ground adjacent one or more of the drive units on the irrigation machine with the anchors being connected to the main frame of the drive unit by means of a chain and chain tightener connector. If the machine is subjected to high winds, the tie-down anchors securely hold or tie down the drive units to the ground, thereby preventing the overturning of the machine.

2 Claims, 5 Drawing Sheets

US 7,438,243 B1

TIE-DOWN ANCHOR FOR A SELF-PROPELLED IRRIGATION SYSTEM

BACKGROUND OF THE INVENTION

1. Field of the Invention

This invention relates to a tie-down anchor for a self-propelled irrigation system and more particularly to a tie-down anchor for preventing the system from overturning in a high wind condition. Even more particularly, this invention prevents the system from overturning in a high wind situation by embedding an anchor into the ground beneath each of the drive units of the system and securing the drive units to the anchors when the system is not going to be used to irrigate.

2. Description of the Related Art

Many irrigation systems such as center pivot systems, corner pivot irrigation systems and lateral move systems will overturn or "tip over" in high wind conditions. To the best of applicant's knowledge, no one in the irrigation industry has anchored the drive units to the ground to prevent the overturning of the system when the system is subjected to high wind conditions and the system is not being used in an irrigating mode.

SUMMARY OF THE INVENTION

A tie-down anchor for a self-propelled irrigation system such as a center pivot irrigation system, a lateral move irrigation system or a corner pivot irrigation system is disclosed. An anchor or anchors are embedded in the ground beneath at least some of the drive units, and preferably all of the drive units, of a self-propelled irrigation system. When the irrigation system is moved to its normal non-irrigating station, chains or the like are wrapped around the main frame of the drive unit and are connected to the anchor embedded in the ground. Preferably, each of the chains includes a chain tightener to firmly connect the main frame to the anchor embedded in the ground.

In the preferred embodiment, the anchor member embedded in the ground comprises a concrete member having upper and lower ends with the upper end thereof having an eyelet provided thereon with the eyelet being connected to rebars positioned within the concrete member. Also in the preferred embodiment, a pair of arcuate shields or guards are positioned around a portion of the main frame between the chains and the main frame to prevent damage to the main frame. When the system is anchored in its rest position, the anchors will prevent the drive towers and the pipeline from overturning if the system is subjected to high winds. In another embodiment, the anchor comprises one or more screw anchors.

It is therefore a principal object of the invention to provide a tie-down anchor for a self-propelled irrigation system such as a center pivot irrigation system, a lateral move irrigation system or a corner pivot irrigation system.

A further object of the invention is to provide a means for preventing an irrigation system from overturning when subjected to high winds.

Still another object of the invention is to provide a device of the type described which is convenient to use.

Yet another object of the invention is to provide a tie-down anchor for a self-propelled irrigation system which is comprised of a concrete member embedded in the ground or one or more screw anchors embedded in the ground beneath at least some of the drive units with chains or the like connecting the anchors to the drive unit.

These and other objects will be apparent to those skilled in the art.

DETAILED DESCRIPTION OF THE INVENTION

Figure 1:
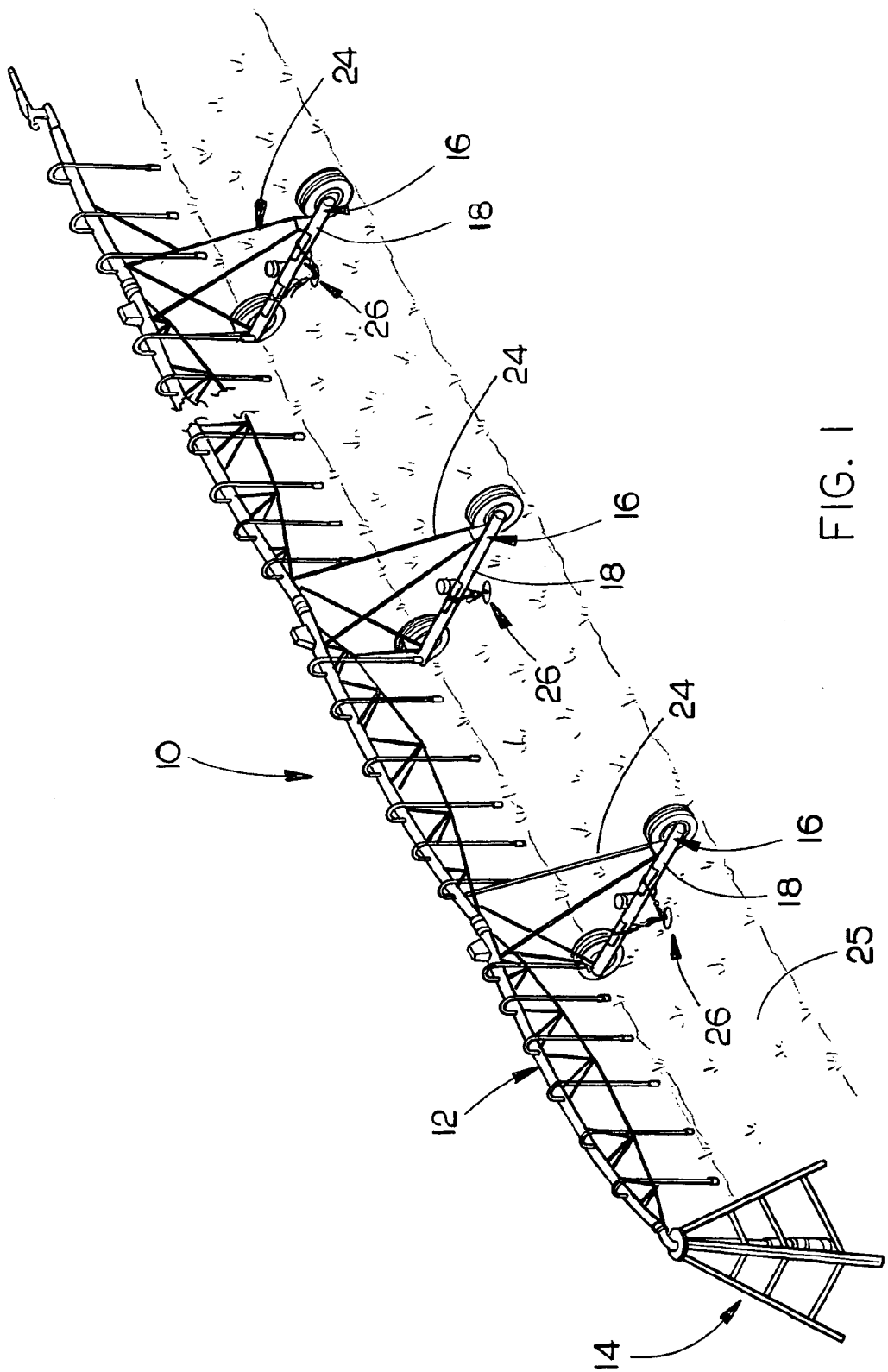
FIG. 1 is a partial perspective view of an irrigation system having the tie-down anchor of this invention secured thereto.
Figure 2:
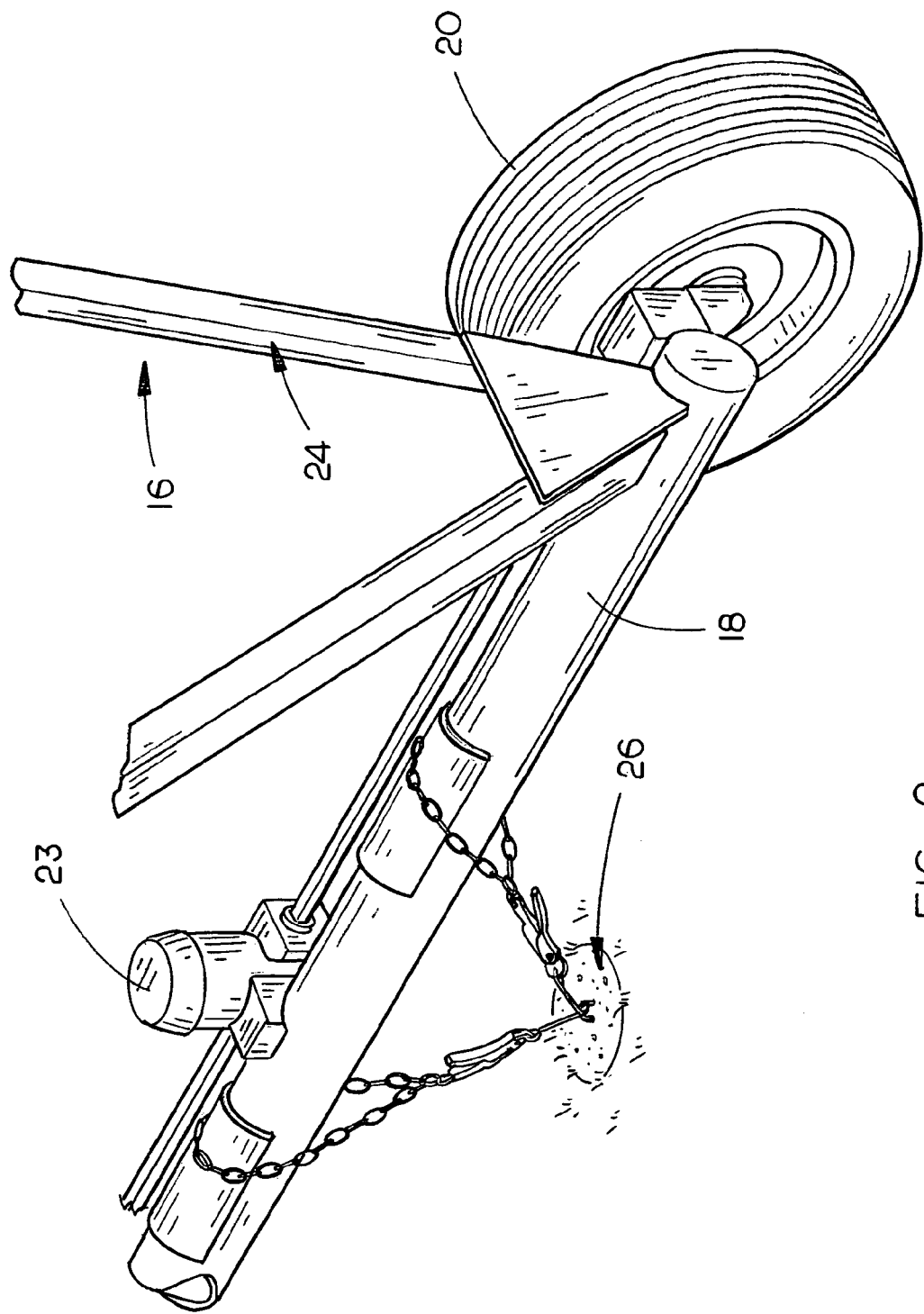
FIG. 2 is a partial perspective view illustrating the main frame of a drive unit being connected to the tie-down anchor.

In the drawings, the numeral 10 refers generally to a conventional self-propelled irrigation system. Although a center pivot irrigation system is disclosed in the drawings, the tie-down anchor of this invention will work equally as well with a lateral move irrigation system or a corner pivot irrigation system. If the system is a center pivot irrigation system, an elongated wire water pipeline 12 extends outwardly from a center pivot structure 14 and is supported upon a plurality of drive towers or drive units 16. If the tie-down anchor of this invention is used with a lateral move irrigation system, the pipeline is supported upon a plurality of drive towers without a center pivot structure since the lateral move irrigation system moves along the length or width of a field while a center pivot structure moves around the fixed center pivot structure.

Each of the drive units 16 normally includes a main frame 18 having drive wheels 20 and 22 mounted on the opposite ends thereof. In most self-propelled irrigation systems today, the wheels 20 and 22 are driven by an electric motor 23 through suitable conventional gearboxes. Each of the drive units 16 also normally includes a support frame 24 which extends upwardly from the opposite ends of the main frame 18 for connection with the water pipeline 12 in conventional fashion.

Figure 3:
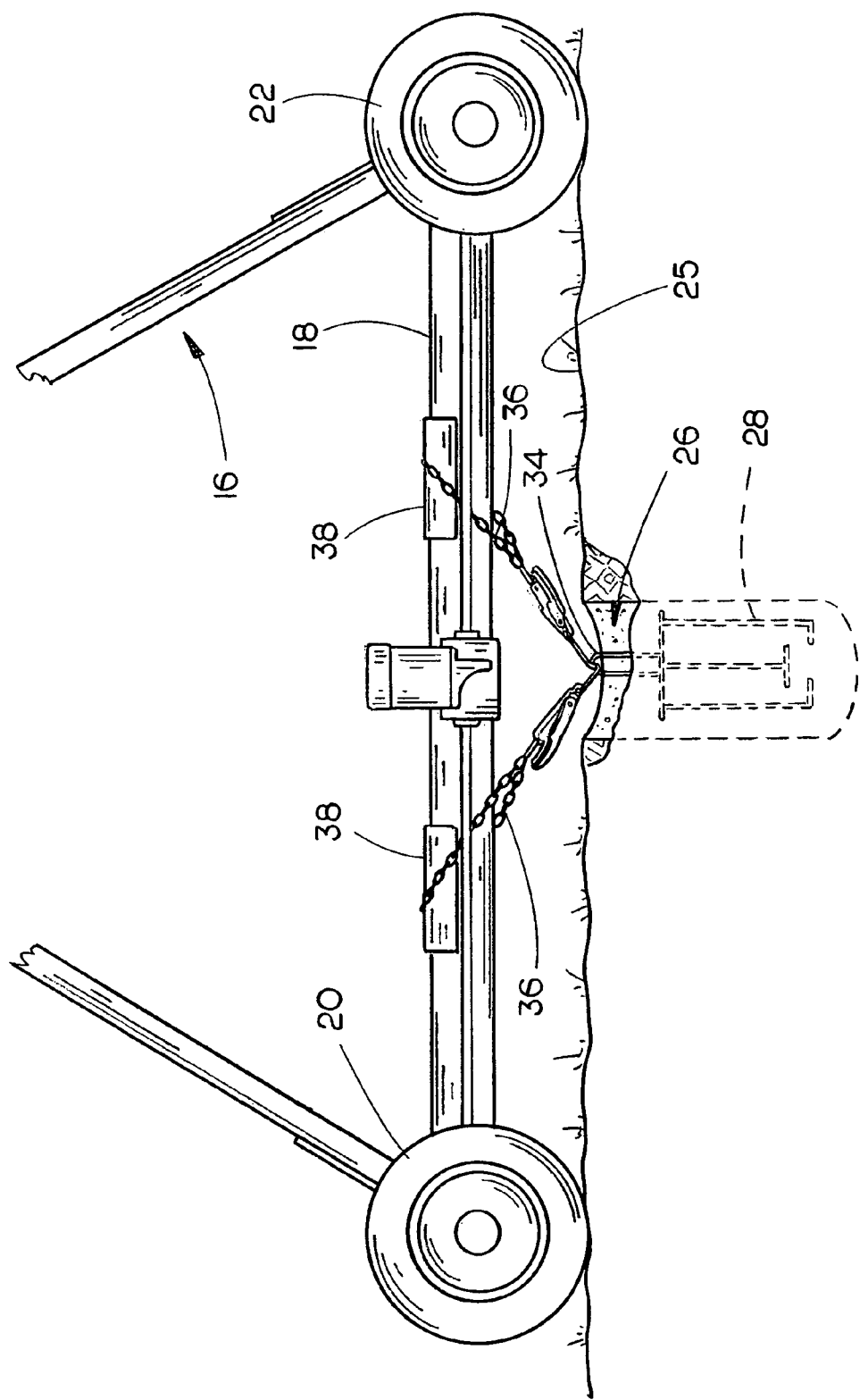
FIG. 3 is a side elevational view of the embodiment of FIG. 2.
Figure 4:
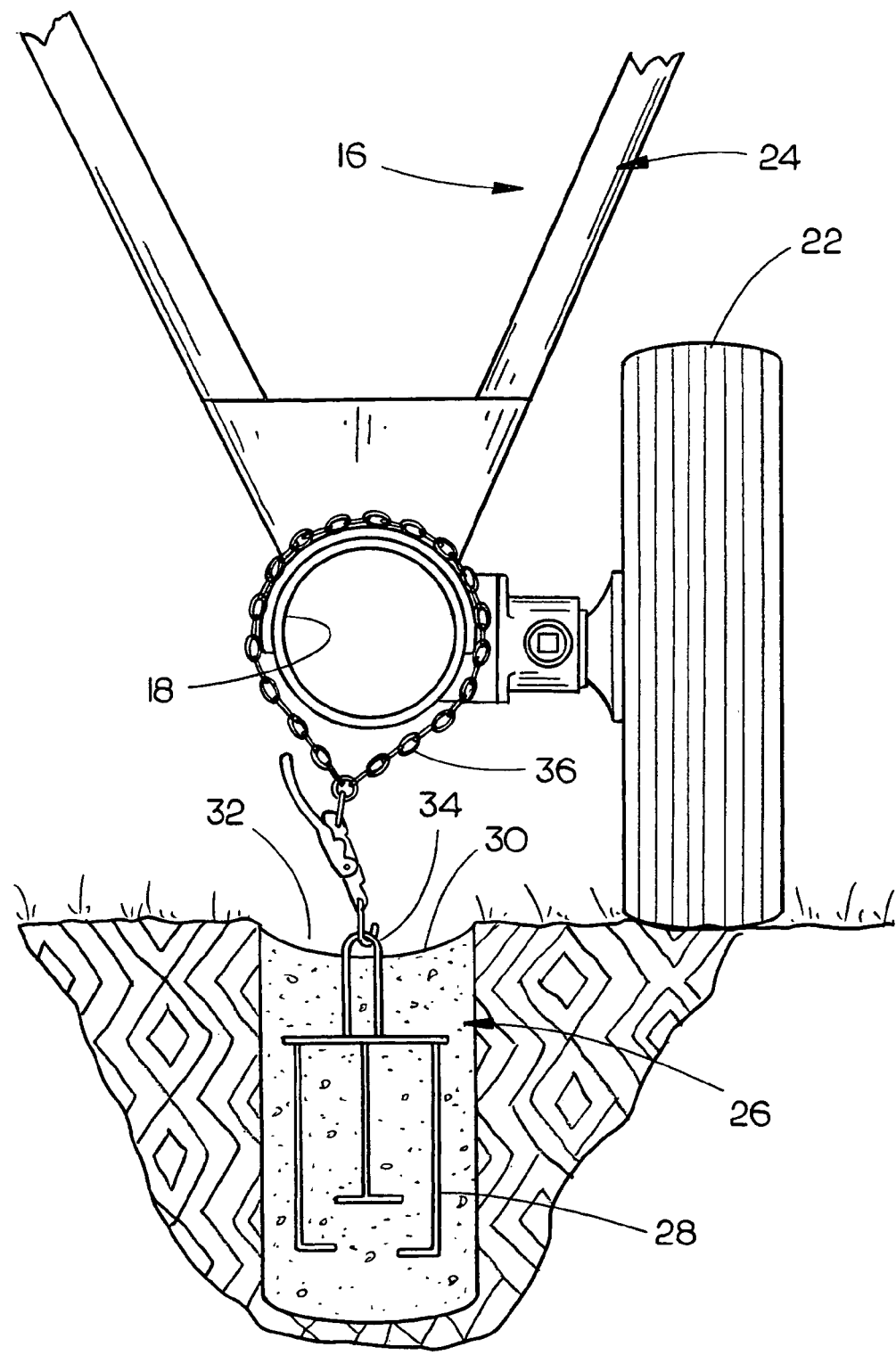
FIG. 4 is a sectional view of the embodiment of FIG. 3.

Normally, when the irrigation systems such as described above are not being used to irrigate, they will be positioned at a particular location in the field. It is that "rest" or "inoperative" position 25 that the tie-down anchor system of this invention is provided. In the preferred embodiment, a concrete member or concrete anchor 26 is embedded in the ground as illustrated in the drawings. Although the drawings illustrated that the concrete anchor 26 is generally cylindrical in shape, the concrete anchor 26 could have an enlarged diameter portion at its lower end to provide additional anchoring. Concrete anchor 26 preferably has reinforcing bars or rebars 28 embedded therein and connected together in conventional fashion. For purposes of description, concrete anchor 26 will be described as having an upper end 30 which is preferably concave in shape so as to provide a recess 32 formed therein. Although the upper end 30 of the concrete member 26 can be located below ground level, it is preferred that the periphery of the upper end 30 be located at ground level (FIG. 4). An eyelet 34 is positioned in the recess 32 with the lower end thereof being affixed to one or more of the rebars 28. Preferably, the eyelet 34 is below ground level, as seen in FIGS. 3 and 4.

The numeral 36 refers to a connector preferably in the form of a chain as shown. A cable or other flexible member such as a strap may also be used. If a chain or cable is used, it is preferred that the chain or cable be coated with a plastic or rubber coating to prevent damage to the galvanizing on the main frame. A flexible rubber or plastic tube or sleeve could also embrace the chain or cable. One or more of the chains 36 may be utilized although the drawings illustrate that a pair of chains is utilized. The chain or chains 36 extend around the main frame 18, as illustrated in the drawings. If desired, the chain 36 may be wrapped around the main frame one or more times. Preferably, an arcuate plate, guard or shield 38 is positioned between the chain 36 and the main frame 18 to prevent damage to the galvanizing on the main frame 18. A chain tightener 40 is also preferably utilized to secure the chain 36 to the anchor so that the chain 36 may be securely tightened to securely anchor the main frame 18 and the drive unit 16 to the ground. The chain tighteners 40 may be omitted if the chains are otherwise secured to the eyelet but it is preferred that chain tighteners be utilized.

When the irrigation system 10 is not going to be used to irrigate, the system is maneuvered to the position so that the drive towers are adjacent the concrete anchors 26 which will be spaced along the length of the system. The chains 36 are then connected to the eyelets by the chain tighteners 40 to securely fasten or anchor the drive unit to the concrete anchors 26. If the system is subjected to high wind conditions, the anchors will prevent the system from tipping over or overturning since the anchor members tie down or hold down the drive units. Although it is preferred that an anchor 26 be provided at each of the drive units 16, it may be that the owner of the system would overturning use an anchor at each drive unit.

Figure 5:
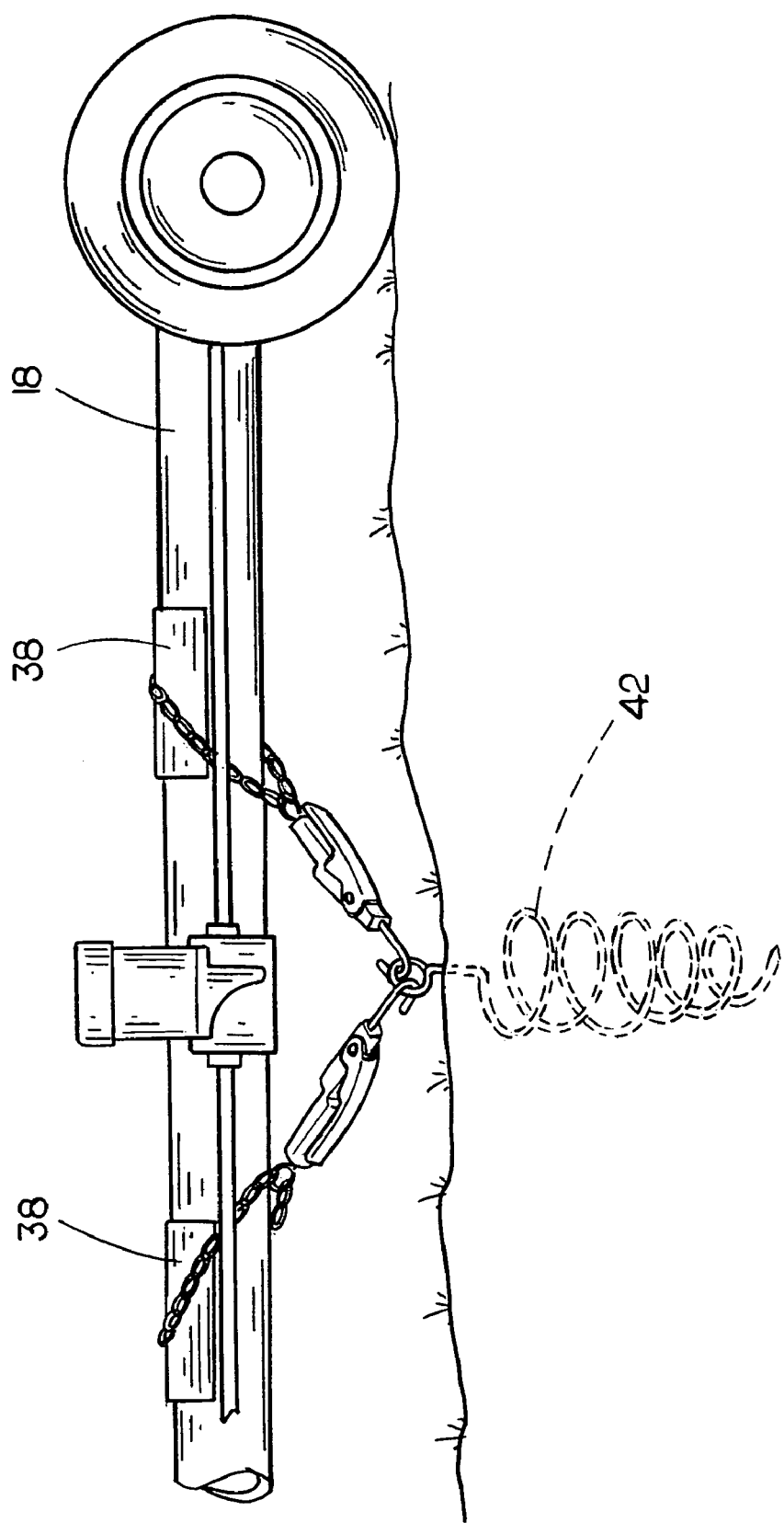
FIG. 5 is a partial elevational view illustrating a further embodiment of the invention.

Although it is preferred that concrete anchors 26 be utilized, it is possible that one or more screw anchors, such as are used to anchor guy wires on utility poles, could be embedded in the ground and connected to the main frame 18 of the drive unit 16 by chains and chain tighteners. FIG. 5 illustrates a screw anchor 42 embedded in the ground with chains 36 connecting the screw anchor to the main frame 18. If desired, a pair of screw anchors 42 may be provided with each of the screw anchors 42 having a chain 36 attached thereto.

Thus it can be seen that a novel tie-down anchor system has been provided for use with center pivot irrigation systems, lateral move irrigation systems or corner pivot irrigation systems which will prevent the systems from overturning in high wind conditions.

Thus it can be seen that the invention accomplishes at least all of its stated objectives.

I claim:

1. A self-propelled irrigation system, comprising:
    an elongated water pipeline supported upon drive units which are spaced along the length of said pipeline;
    said drive units each including an elongated main frame having drive wheels at the opposite ends thereof and a support frame extending upwardly from said main frame to said pipeline;
    at least some of said drive units having a selectively useable tie-down anchor associated therewith;
    said tie-down anchor adapted to anchor the associated drive unit to the ground;
    said tie-down anchor comprising upper and lower ends and wherein an eyelet is secured to the upper end thereof;
    said eyelet being positioned below ground level;
    said anchor member having upper and lower ends and wherein an eyelet is secured to the upper end thereof;
    said eyelet being positioned below ground level;
    said connector being secured to said eyelet;
    said anchor member comprising a concrete member having reinforcing bars embedded therein and wherein said eyelet is secured to said reinforcing bars.

2. In combination with a self-propelled irrigation system comprising an elongated water pipeline supported upon the upper ends of drive units which are spaced along the length of said pipeline; said drive units each including an elongated main frame having drive wheels at the opposite ends thereof and a support frame extending upwardly from said main frame to said pipeline:
    a selectively useable drive unit tie-down anchor associated with at least some of the drive units to selectively anchor the associated drive unit to the ground;
    said tie-down anchor comprising an anchor member embedded in the ground beneath the drive unit and a connector extending between said anchor member and said main frame;
    said anchor member having upper and lower ends and wherein an eyelet is secured to the upper end thereof;
    said eyelet being positioned below ground level;
    said connector being secured to said eyelet;
    said anchor member comprising a concrete member having reinforcing bars embedded therein and wherein said eyelet is secured to said reinforcing bars.

* * * * *

UNITED STATES PATENT AND TRADEMARK OFFICE
CERTIFICATE OF CORRECTION

PATENT NO. : 7,438,243 B1  Page 1 of 1
APPLICATION NO. : 10/884667
DATED : October 21, 2008
INVENTOR(S) : Lauren N. Erickson It is certified that error appears in the above-identified patent and that said Letters Patent is hereby corrected as shown below:

Column 4, Claim 1, lines 15-17, should be deleted "said anchor member…"
Column 4, Claim 1, line 19, after word "said" insert --tie-down.--
Column 4, Claim 1, line 19, after word "anchor" delete "member."

Signed and Sealed this

First Day of September, 2009

David J. Kappos
*Director of the United States Patent and Trademark Office*